(12) United States Patent
Tateyama

(10) Patent No.: US 10,979,596 B2
(45) Date of Patent: Apr. 13, 2021

(54) IMAGE FORMING APPARATUS

(71) Applicant: KYOCERA Document Solutions Inc., Osaka (JP)

(72) Inventor: Yoshitaka Tateyama, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/799,211

(22) Filed: Feb. 24, 2020

(65) Prior Publication Data

US 2020/0280653 A1 Sep. 3, 2020

(30) Foreign Application Priority Data

Feb. 28, 2019 (JP) .............................. JP2019-035434

(51) Int. Cl.
*H04N 1/387* (2006.01)

(52) U.S. Cl.
CPC ......... *H04N 1/3872* (2013.01); *H04N 1/3876* (2013.01)

(58) Field of Classification Search
None
See application file for complete search history.

(56) References Cited

U.S. PATENT DOCUMENTS

| 5,459,586 | A  | * | 10/1995 | Nagasato | ............. | H04N 1/3872 |
|---|---|---|---|---|---|---|
| | | | | | | 358/450 |
| 2005/0093886 | A1 | * | 5/2005 | Kubota | ................ | H04N 1/3872 |
| | | | | | | 345/619 |
| 2010/0225787 | A1 | * | 9/2010 | Makino | .................. | H04N 5/272 |
| | | | | | | 348/239 |
| 2017/0280012 | A1 | * | 9/2017 | Matsuo | ............. | H04N 1/00408 |
| 2019/0073342 | A1 | * | 3/2019 | Wilson | .................. | G06F 40/117 |

FOREIGN PATENT DOCUMENTS

JP 2002-192791 A 7/2002

* cited by examiner

*Primary Examiner* — Lennin R Rodriguezgonzalez
(74) *Attorney, Agent, or Firm* — Stein IP, LLC

(57) ABSTRACT

An image forming apparatus includes a control unit configured to perform area division by color of an original image included in input image data, and to generate masking sheet image data of each color including a cutout guide image corresponding to a color unit area obtained by the area division by color of the original image, on the basis of color density and a shape of the color unit area; and a printing unit configured to execute a print job based on the masking sheet image data so as to print the cutout guide image on a material sheet.

8 Claims, 11 Drawing Sheets

IMAGE FORMING APPARATUS

INCORPORATION BY REFERENCE

This application is based upon and claims the benefit of priority from the corresponding Japanese Patent Application No. 2019-035434 filed Feb. 28, 2019, the entire contents of which are hereby incorporated by reference.

BACKGROUND

The present disclosure relates to an image forming apparatus that prints an image on a sheet.

Conventionally, there is known an image forming apparatus that can divide image data of one page into a plurality of sets of image data. For instance, the conventional image forming apparatus divides A1 size image data into four A3 size image data. In this way, the A1 size image data can be divided and printed on four A3 sheets.

SUMMARY

An image forming apparatus according to the present disclosure is an image forming apparatus that prints a cutout guide image indicating a cutout area as an area to be cut out on a material sheet to be used as a masking sheet. The image forming apparatus includes a control unit and a printing unit. The control unit performs area division by color of an original image included in input image data input to the image forming apparatus, and generates masking sheet image data of each color including the cutout guide image corresponding to a color unit area obtained by the area division by color of the original image, on the basis of color density and a shape of the color unit area. The printing unit executes a print job based on the masking sheet image data so as to print the cutout guide image on the material sheet.

DETAILED DESCRIPTION

<Structure of Image Forming Apparatus>

Figure 1:
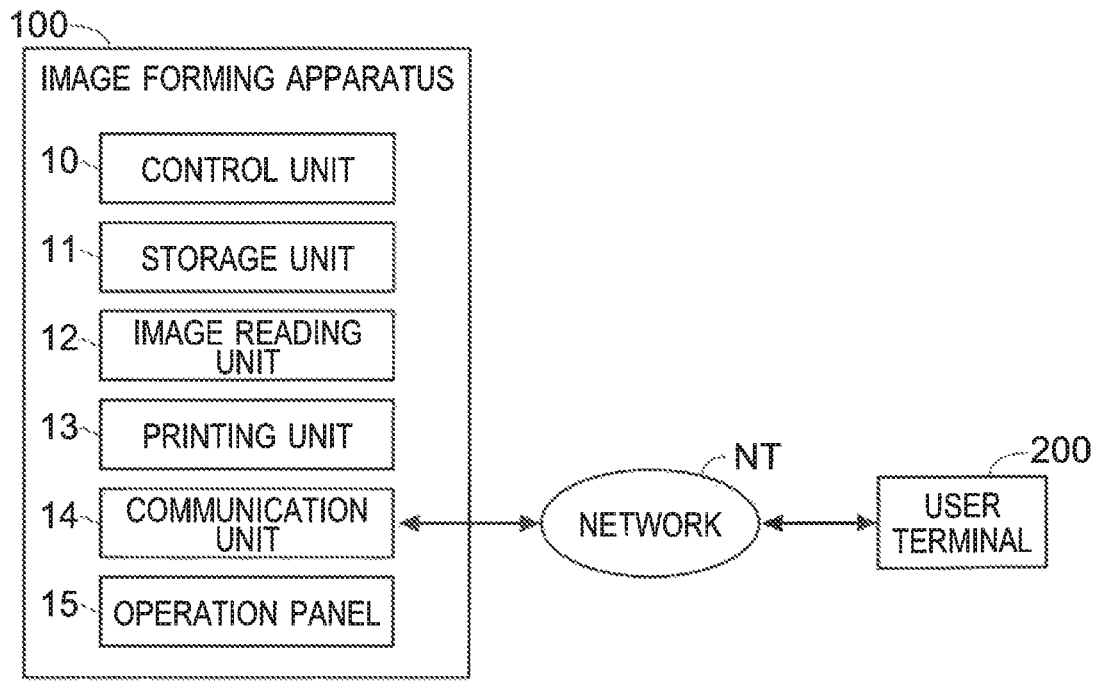
FIG. 1 is a block diagram illustrating a structure of an image forming apparatus according to one embodiment of the present disclosure.

As illustrated in FIG. 1, an image forming apparatus 100 according to this embodiment includes a control unit 10. In addition, the image forming apparatus 100 includes a storage unit 11. The control unit 10 includes a CPU. The control unit 10 controls the image forming apparatus 100 on the basis of a control program and control data. The storage unit 11 includes a nonvolatile memory (ROM) and a volatile memory (RAM). The storage unit 11 is connected to the control unit 10. The control unit 10 reads information from the storage unit 11 and writes information in the storage unit 11. The control program and the control data are stored in the storage unit 11.

Further, the image forming apparatus 100 includes an image reading unit 12 and a printing unit 13. The image reading unit 12 and the printing unit 13 are connected to the control unit 10, The control unit 10 controls a reading operation by the image reading unit 12 and a printing operation by the printing unit 13.

The image reading unit 12 reads a document image (an image recorded on a document) so as to generate read image data. The image reading unit 12 includes a light source and an image sensor. The light source illuminates the document. The image sensor receives reflection light reflected by the document and performs photoelectric conversion. In the case where the image forming apparatus 100 is equipped with the image reading unit 12, image data including the document image can be input to the image forming apparatus 100.

The printing unit 13 executes a print job for printing an image based on image data on a sheet. In the print job, for example, an image based on the image data obtained by reading by the image reading unit 12 is printed on the sheet. Sheets to be used for the print job are stored in a sheet cassette.

When the print job is executed, the printing unit 13 supplies the sheet from the sheet cassette to a sheet conveying path and conveys the sheet along the sheet conveying path. In addition, the printing unit 13 forms an image based on the image data. Further, the printing unit 13 prints the image on the sheet that is being conveyed.

The printing unit 13 includes a photosensitive drum, a charging device, an exposing device, a developing device, and a transfer roller. In addition, the printing unit 13 includes a fixing device. The photosensitive drum carries a toner image. The charging device charges the circumference surface of the photosensitive drum. The exposing device forms an electrostatic latent image on the circumference surface of the photosensitive drum. The developing device develops the electrostatic latent image formed on the circumference surface of the photosensitive drum into a toner image. The transfer roller presses and contacts the photosensitive drum so that a transfer nip is formed between the transfer roller and the photosensitive drum.

The sheet that is being conveyed passes through the transfer nip. When the sheet passes through the transfer nip, the toner image on the circumference surface of the photosensitive drum is transferred onto the sheet. The sheet with the transferred toner image is conveyed to the fixing device. The fixing device fixes the toner image onto the sheet.

Further, the image forming apparatus 100 includes a communication unit 14. The communication unit 14 is an interface for connecting the image forming apparatus 100 to a network NT such as a LAN, and it includes a communication circuit, a communication memory, a communication connector, and the like.

The communication unit 14 is connected to the control unit 10. The control unit 10 controls the communication unit 14. The control unit 10 uses the communication unit 14 for communication with a user terminal 200 (a personal computer) connected to the network NT. By connecting the user terminal 200 to the network NT, image data can be input from the user terminal 200 to the image forming apparatus 100.

Further, the image forming apparatus 100 includes an operation panel 15. The operation panel 15 receives an operation by a user. The operation panel 15 includes a touch screen. The touch screen displays a screen in which software buttons are arranged. The operation panel 15 is also equipped with hardware buttons. The hardware buttons include a start button for instructing the image forming apparatus 100 to execute a job using the image data obtained by reading by the image reading unit 12.

The operation panel 15 is connected to the control unit 10. The control unit 10 controls a display operation by the operation panel 15. In addition, the control unit 10 detects an operation made on the operation panel 15. In other words, the control unit 10 detects an operation to the touch screen (the software button) and an operation to the hardware buttons.

<Guide Image Printing Process>

Figure 5:
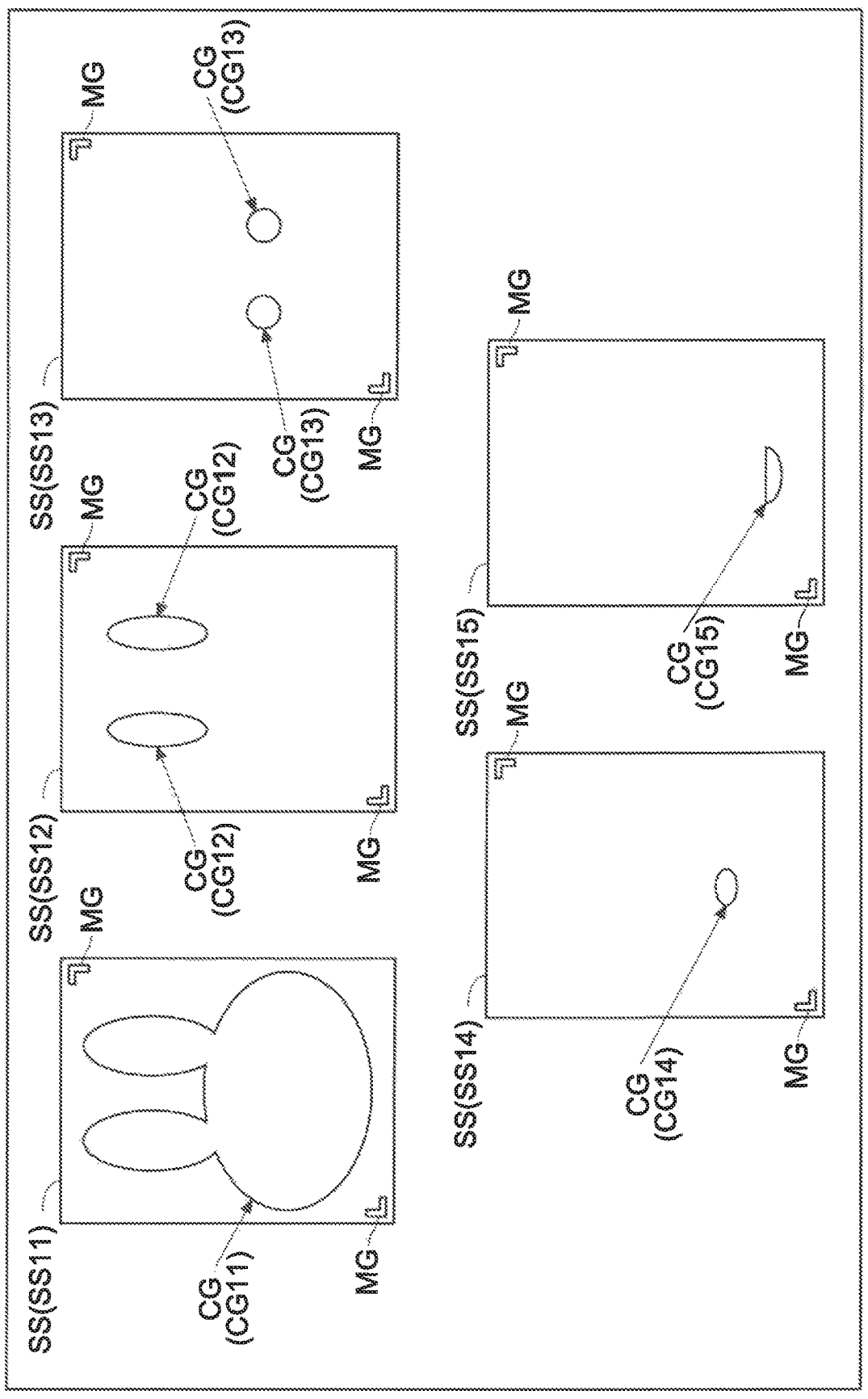
FIG. 5 is a diagram illustrating material sheets on which cutout guide images are printed by the image forming apparatus according to one embodiment of the present disclosure.
Figure 6:
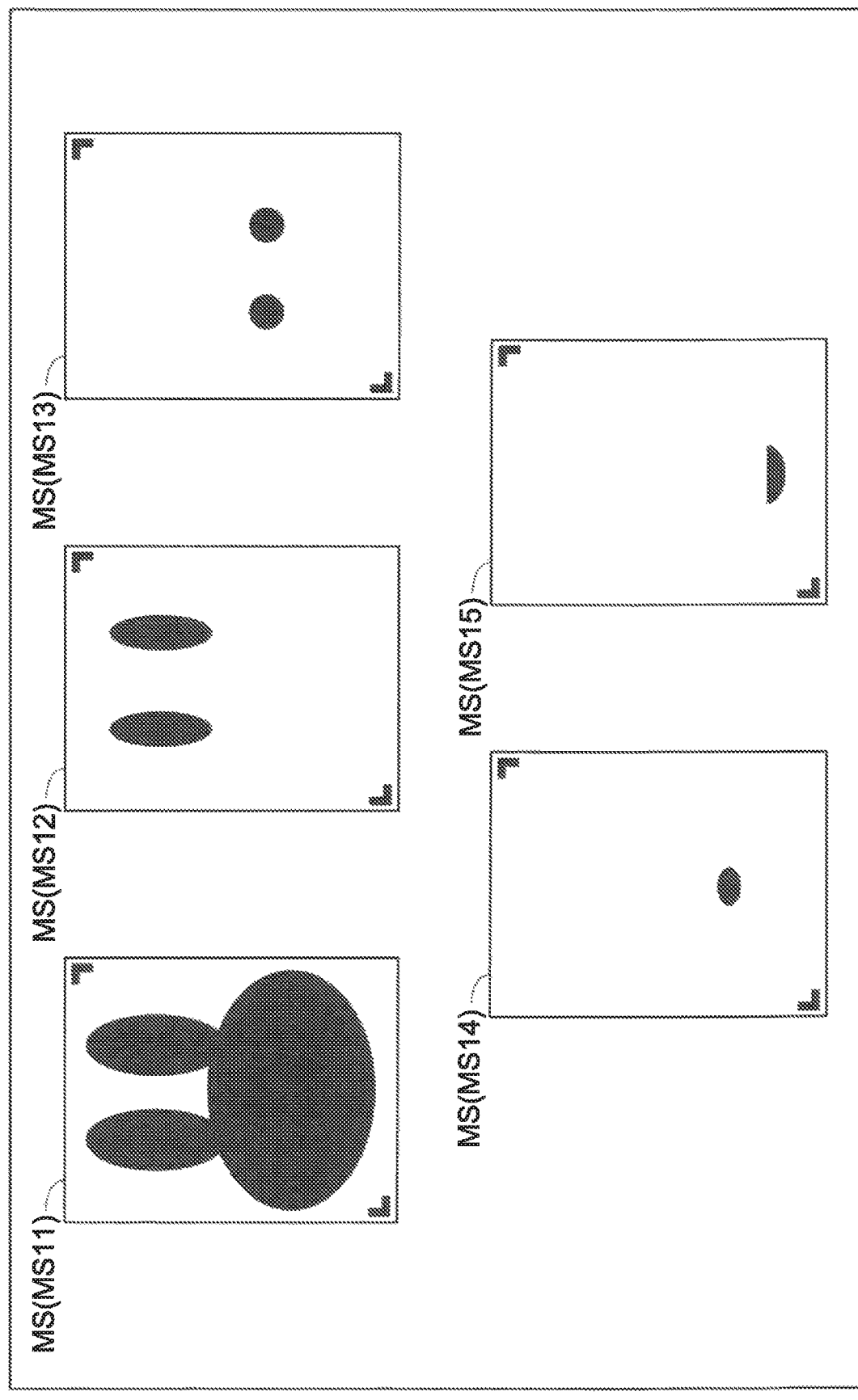
FIG. 6 is a diagram illustrating a state in which parts corresponding to the cutout guide images are cut out from the material sheet illustrated in FIG. 5 (a diagram illustrating masking sheets).

The image forming apparatus 100 has a guide image printing function in which a cutout guide image CG (see FIGS. 4 and 5) is printed on a material sheet SS (see FIG. 5) such as sticker paper that is used as a masking sheet MS (see FIG. 6). The cutout guide image CG is an image indicating an area to be cut out (hereinafter referred to as a cutout area). By cutting out the cutout area indicated by the cutout guide image CG printed on the material sheet SS, the user's desired masking sheet MS can be obtained.

When allowing the image forming apparatus 100 to execute the print job for printing the cutout guide image CG on the material sheet SS (referred to as a guide image print job in the following description), the user sets the guide image printing function enabled and sets the material sheets SS in the sheet cassette. In addition, the user sets on the image forming apparatus 100 the document on which an original image OG (see FIG. 3) is recorded. Then, the user operates the start button of the operation panel 15.

When the control unit 10 detects the operation to the start button of the operation panel 15 in the state where the guide image printing function is set enabled, the control unit 10 controls the image reading unit 12 to read the document image (the original image OG) set on the image forming apparatus 100. In this way, the image data including the original image OG is input to the image forming apparatus 100. When the image data including the original image OG is input to the image forming apparatus 100, the control unit 10 performs a guide image printing process for allowing the printing unit 13 to execute the guide image print job on the basis of the image data including the original image OG.

Note that the image data including the original image OG can be input to the image forming apparatus 100 also by sending the image data including the original image OG from the user terminal 200 to the image forming apparatus 100. The image data including the original image OG is received by the communication unit 14. When the image data including the original image OG is sent from the user terminal 200 to the image forming apparatus 100, an instruction to execute the guide image print job can be sent together with the image data including the original image OG. When the communication unit 14 receives the instruction to execute the guide image print job together with the image data (when the image data including the original image OG is input to the image forming apparatus 100), the control unit 10 performs the guide image printing process for allowing the printing unit 13 to execute the guide image print job.

Figure 2:
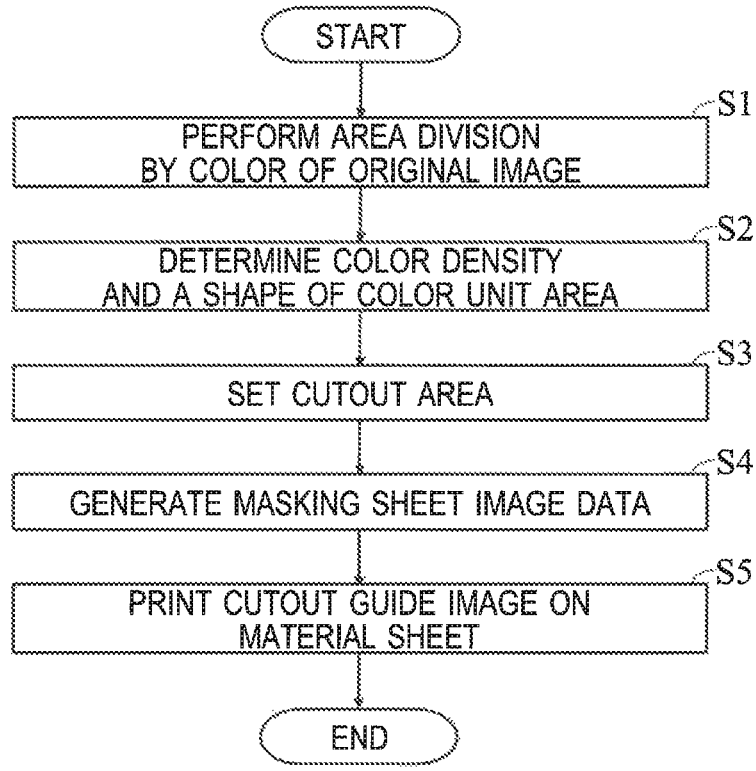
FIG. 2 is a flowchart illustrating a flow of a guide image printing process performed by a control unit of the image forming apparatus according to one embodiment of the present disclosure.

With reference to the flowchart shown in FIG. 2, a flow of the guide image printing process performed by the control unit 10 is described below. The flowchart shown in FIG. 2 starts when the image data including the original image OG is input to the image forming apparatus 100.

In Step S1, the control unit 10 performs area division by color of the original image OG included in the input image data input to the image forming apparatus 100. Note that it may be possible to perform a color reduction process (e.g. a process of reducing the number of colors from RGB 8 bits each to RGB 2 bits each) of the input image data, and to perform the area division by color of the original image OG after the color reduction process.

Figure 3:
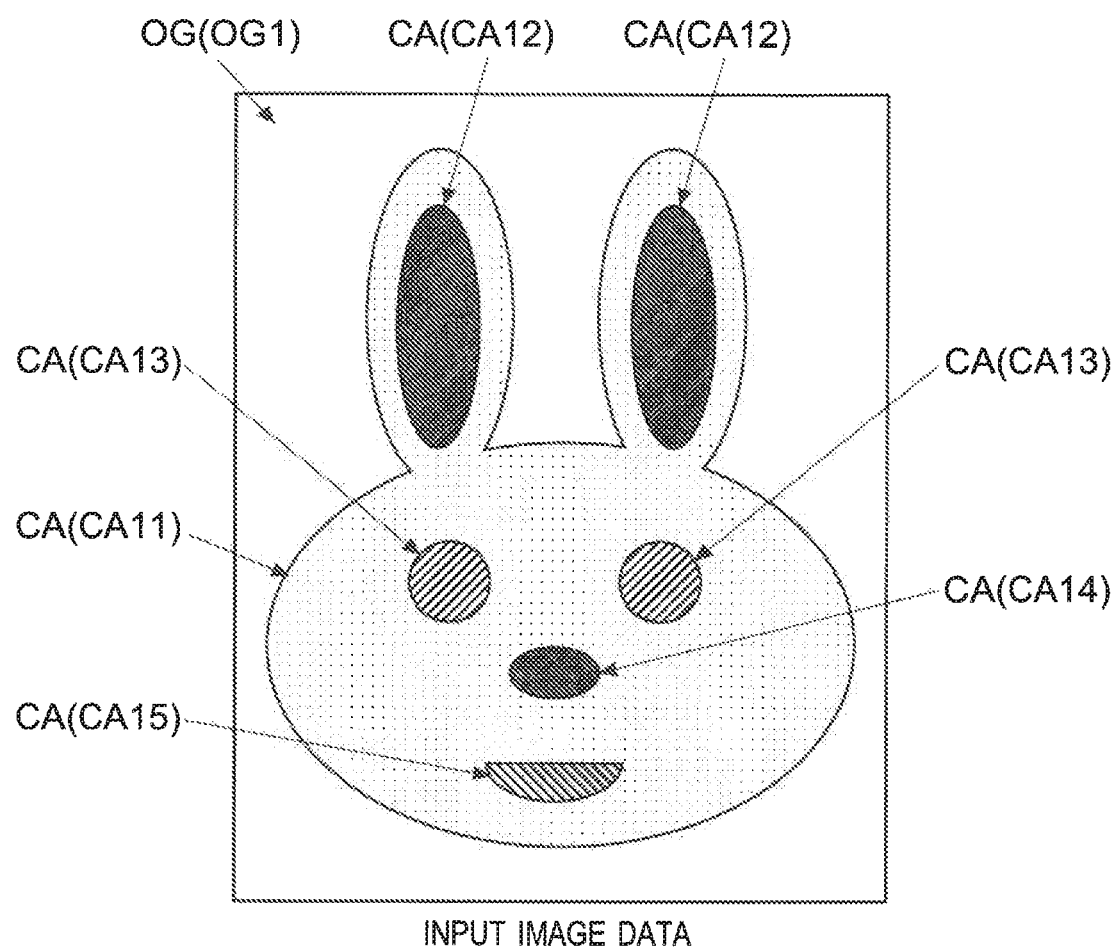
FIG. 3 is a diagram illustrating image data including an original image input to the image forming apparatus according to one embodiment of the present disclosure.

In Step S2, the control unit 10 performs a color determination process for determining color density of a color unit area CA obtained by the area division by color of the original image OG, on the basis of an RGB mixture ratio of the color unit area CA (see FIG. 3). For instance, the storage unit 11 stores in advance color information indicating a correspondence between the RGB mixture ratio and a color density level (color density grade). The control unit 10 determines the color density of the color unit area CA on the basis of the density level corresponding to color of the color unit area CA. In addition, the control unit 10 performs a shape determination process for determining a shape of the color unit area CA.

In Step S3, on the basis of color density of the color unit area CA and a shape of the color unit area CA, the control unit 10 sets the cutout area of each color indicated by the cutout guide image CG corresponding to the color unit area CA. Further, in Step S4, the control unit 10 generates masking sheet image data MD (see FIG. 4) of each color, which includes the cutout guide image CG corresponding to the color unit area CA. In this way, the masking sheet image data MD are generated in at least the same number as the number of colors used in the original image OG. Note that, in some cases, a plurality of masking sheet image data MD corresponding to a certain color may be generated.

In Step S5, the control unit 10 controls the printing unit 13 to execute the guide image print job based on the masking sheet image data MD. The printing unit 13 prints the cutout guide image CG on the material sheet SS by executing the guide image print job based on the masking sheet image data MD. If there are a plurality of masking sheet image data MD, printing based on the plurality of masking sheet image data MD is performed one by one.

For instance, it is supposed that the image data including the original image OG (OG1) illustrated in FIG. 3 is input to the image forming apparatus 100. In addition, it is supposed that the original image OG1 is divided into five color unit areas CA (CA11 to CA15) by the area division.

Figure 4:
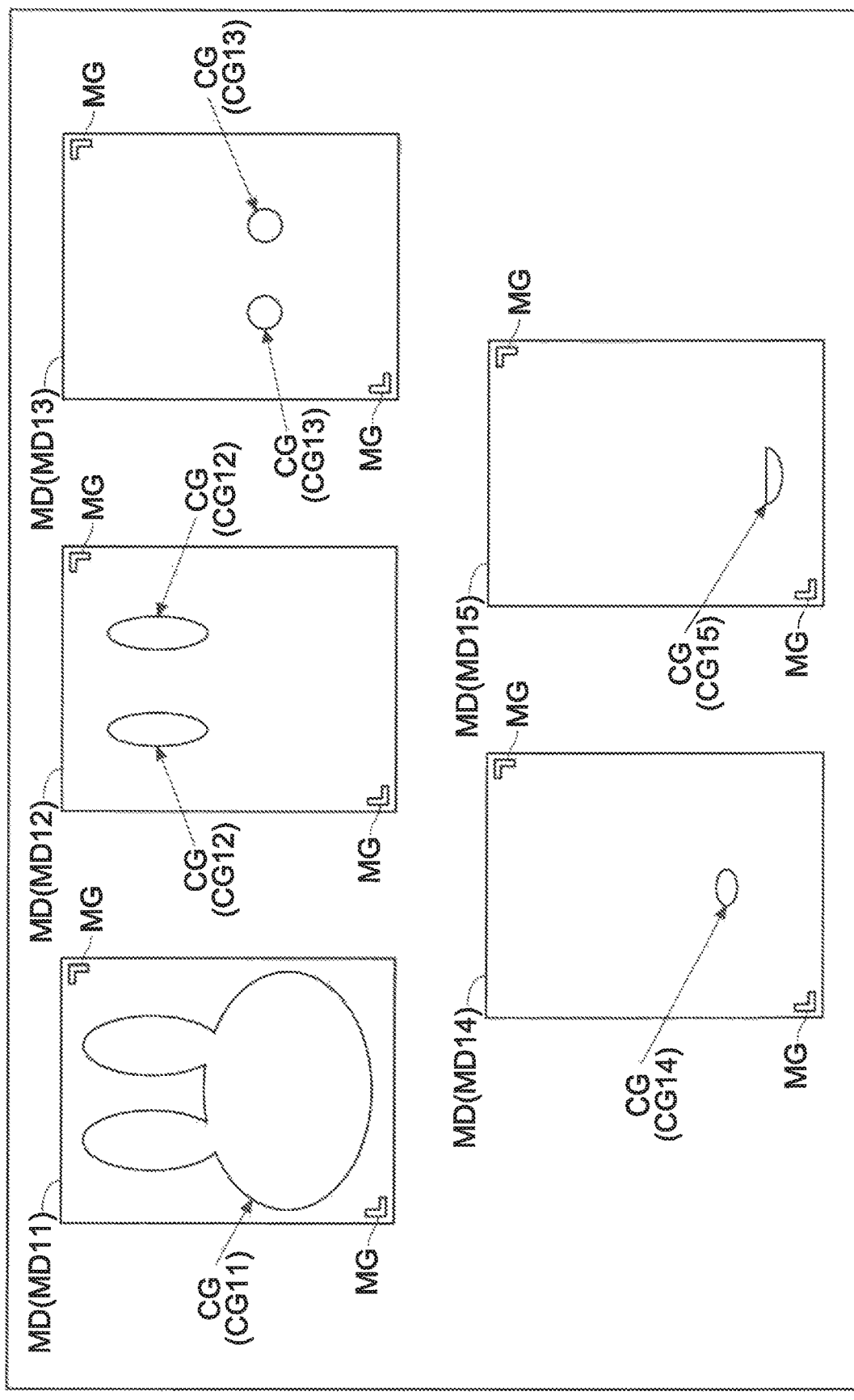
FIG. 4 is a diagram illustrating masking sheet image data generated by the image forming apparatus according to one embodiment of the present disclosure.

In this case, as illustrated in FIG. 4, five masking sheet image data MD (MD11 to MD15) are generated. The masking sheet image data MD11 corresponds to a color of the color unit area CA11. The masking sheet image data MD12 corresponds to a color of the color unit area CA12. The masking sheet image data MD13 corresponds to a color of the color unit area CA13. The masking sheet image data MD14 corresponds to a color of the color unit area CA14. The masking sheet image data MD15 corresponds to a color of the color unit area CA15.

Here, when the control unit 10 generates the masking sheet image data MD corresponding to a color of a certain color unit area CA, the control unit 10 allows the masking sheet image data MD to include an image indicating a contour line of the color unit area CA as the cutout guide image CG. A line forming the cutout guide image CG may be a solid line or a broken line. The cutout guide image CG is an image indicating a cutout line.

In the example illustrated in FIG. 4, the cutout guide image CG included in the masking sheet image data MD11 is denoted by CG11 The cutout guide image CG included in the masking sheet image data MD12 is denoted by CG12. The cutout guide image CG included in the masking sheet image data MD13 is denoted by CG13. The cutout guide image CG included in the masking sheet image data MD14 is denoted by CG14. The cutout guide image CG included in the masking sheet image data MD15 is denoted by CG15.

Further, when the control unit 10 generates a plurality of masking sheet image data MD, the control unit 10 attaches a predetermined mark image MG (see FIGS. 4 and 5) to the plurality of masking sheet image data MD at the same position. In this case, the control unit 10 recognizes a non-image region having no cutout guide image CG in each of the plurality of masking sheet image data MD. Then, the control unit 10 sets a position to which the mark image MG is attached so that the mark image MG is attached to the non-image region. Note that, similarly to the cutout guide image CG, the mark image MG is an image indicating the cutout area and is an image indicated by a solid line or a broken line.

When the guide image print job based on the masking sheet image data MD illustrated in FIG. 4 is executed, the image forming apparatus 100 outputs material sheets SS11 to SS15 on which the cutout guide images CG11 to CG15 are printed, respectively, as illustrated in FIG. 5. The user performs a cutting work for cutting out the material sheets SS11 to SS15 along the cutout lines (the cutout guide images CG11 to CG15). In this case, the user also cuts out the cutout area indicated by the mark image MG. In this way, five masking sheets MS11 to MS15 illustrated in FIG. 6 are obtained. Note that a cut area (opening) formed by the cutting work is shown as a black solid area in FIG. 6. The same is true in other drawings that are referred to in the following description.

After finishing the cutting work, the user first covers an object with the masking sheet MS11, and in this state, coloring material corresponding to the color of the color unit area CA11 is applied to the object. Next, the user covers the object with the masking sheet MS12. In this case, the user sets the mark opening (the opening obtained by cutting the cutout area indicated by the mark image MG) of the masking sheet MS12 to match the image corresponding to the mark image MG formed on the object. In this state, the user applies coloring material corresponding to the color of the color unit area CA12 to the object. After that, the user performs drawing using the masking sheets MS13 to MS15 one by one in the same method as the drawing method using the masking sheet MS12. In this way, the same image as the original image OG1 is drawn on the object.

As described above, the image forming apparatus 100 of this embodiment includes the control unit 10 that performs the area division by color of the original image OG included in the input image data input to the image forming apparatus 100, and generates the masking sheet image data MD of each color including the cutout guide image CG corresponding to the color unit area CA on the basis of color density and a shape of the color unit area CA; and the printing unit 13 that executes a print job based on the masking sheet image data MD so as to print the cutout guide image CG on the material sheet SS.

With the structure of this embodiment, area division by color of the original image OG is automatically performed, and the masking sheet image data MD of each color including the cutout guide image CG corresponding to the color unit area CA is generated. Then, the cutout guide image CG is printed on the material sheet SS. In this way, the user is not required to prepare in advance a divided image obtained by dividing the original image OG for each color (the user is only required to input the image data including the original image OG into the image forming apparatus 100). As a result, time and effort for making the masking sheet MS can be reduced, and hence convenience for the user is improved.

Further, with the structure of this embodiment, the mark image MG is printed on the masking sheet MS. By cutting the area corresponding to the mark image MG on the masking sheet MS, the mark opening is formed in the masking sheet MS. By drawing on the object using the masking sheet MS with the mark opening, the mark is formed on the object. In this way, after drawing using a certain masking sheet MS (referred to as a first masking sheet MS), another masking sheet MS (referred to as a second masking sheet MS) is used for drawing, and in this case, registration of the second masking sheet MS is performed so that a position of the mark opening formed in the second masking sheet MS matches the position of the mark formed on the object. Thus, misregistration of the image drawn using the second masking sheet MS can be suppressed.

<Setting of Cutout Area>

A method for setting the cutout area performed by the control unit 10 is described below.

(First Process)

The control unit 10 determines whether or not the original image OG has a color unit area CA that encloses another area all around. Note that the color unit area CA that encloses another area all around corresponds to a "base area". In the following description, the color unit area CA is referred to as the base area CA. If the original image OG includes the base area CA, the control unit 10 determines whether or not the another area (the area enclosed by the base area CA all around) is a color unit area CA of darker color than the base area CA. If the original image OG includes the base area CA and if the another area enclosed by the base area CA all around is a color unit area CA of darker color than the base area CA, the control unit 10 performs a first process. The first process is specifically described below.

If the original image OG includes the base area CA and if the another area enclosed by the base area CA all around is a color unit area CA of darker color than the base area CA, the control unit 10 allows the masking sheet image data MD corresponding to a color of the base area CA to include the cutout guide image CG indicating that the entire area inside the contour line of the base area CA is the cutout area. In addition, the control unit 10 allows the masking sheet image data MD corresponding to a color of the color unit area CA enclosed by the base area CA all around (the area of darker color than the base area CA) to include the cutout guide image CG indicating that the color unit area CA enclosed by the base area CA all around is the cutout area.

Figure 7:
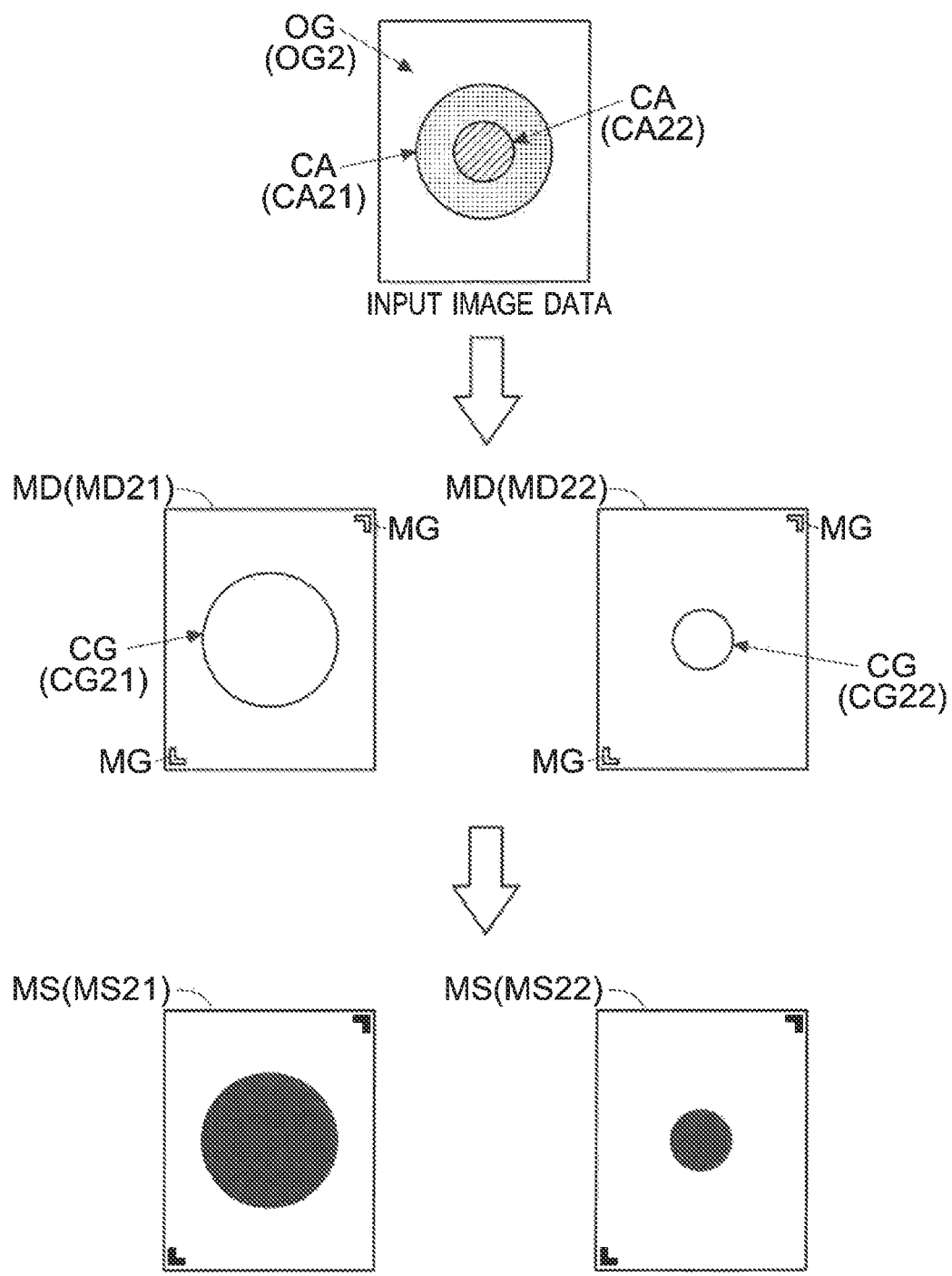
FIG. 7 is a diagram for explaining a first process performed by the control unit of the image forming apparatus according to one embodiment of the present disclosure.

For instance, it is supposed that an original image OG (OG2) includes a base area CA (CA21) as illustrated in the upper part of FIG. 7. In addition, it is supposed that the base area CA21 encloses another color unit area CA (CA22) all around. Furthermore, it is supposed that the color unit area CA22 (another area) is an area of darker color than the base area CA21.

In this case, as illustrated in the middle part in FIG. 7, the masking sheet image data MD (MD21) corresponding to a color of the base area CA21 includes a cutout guide image CG (CG21) indicating that the entire area inside the contour line of the base area CA21 is the cutout area. In addition, the masking sheet image data MD (MD22) corresponding to a color of the color unit area CA22 enclosed by the base area CA21 all around includes a cutout guide image CG (CG22) indicating that the color unit area CA22 is the cutout area. Note that the masking sheet image data MD21 and MD22 also include the mark images MG.

After finishing the guide image print job based on the masking sheet image data MD illustrated in the middle part in FIG. 7, the cutting work is performed, and hence the masking sheets MS (MS21 and MS22) are made as illustrated in the lower part of FIG. 7. The masking sheet MS21 corresponds to a color of the base area CA21. The masking sheet MS22 corresponds to a color of the color unit area CA22.

After the masking sheets MS illustrated in the lower part of FIG. 7 are made, the user first covers an object with the masking sheet MS21, and in this state, coloring material corresponding to the color of the base area CA21 (lighter than that of the color unit area CA22) is applied to the object. Next, the user covers the object with the masking sheet MS22, and in this state, coloring material corresponding to the color of the color unit area CA22 is applied to the object. In other words, the coloring material corresponding to the color of the color unit area CA22 is applied (reapplied) onto a part of the colored part with the coloring material corresponding to the color of the base area CA21 on the object.

Here, in a conventional method for drawing on an object the original image OG2 illustrated in the upper part of FIG. 7, for example, coloring material is applied to a part corresponding to the color unit area CA22 in a state where only the part corresponding to the color unit area CA22 is exposed, and after that, the part outside the part corresponding to the base area CA21 is masked while the part corresponding to the color unit area CA22 is also masked, and in this state, coloring material is applied to the part corresponding to the base area CA21. However, this conventional method requires the masking sheet for exposing only the part corresponding to the color unit area CA22, the masking sheet for masking the part outside the part corresponding to the base area CA21, and the masking sheet for masking the part corresponding to the color unit area CA22 (three masking sheets are required).

In contrast, in the structure in which the first process is performed, only two masking sheets MS21 and MS22 are required as the masking sheets MS necessary for drawing on the object (the number of masking sheets MS to be used in the drawing work can be reduced). As a result, workload of the drawing work can be reduced, and hence convenience for the user is improved.

Note that when the masking sheets MS21 and MS22 are used, as for the part corresponding to the color unit area CA22 on the object, it is necessary to reapply coloring material corresponding to the color of the color unit area CA22 onto coloring material corresponding to the color of the base area CA21, but the color of the color unit area CA22 is darker than that of the color of the base area CA21. Therefore, the color of the base area CA21 can be prevented from being seen through in the reapplied part.

(Second Process)

The control unit 10 determines whether or not the original image OG includes the base area CA (color unit area CA) that encloses another area all around. If the original image OG includes the base area CA, the control unit 10 determines whether or not the another area (the area enclosed by the base area CA all around) is a color unit area CA of lighter color than the base area CA. If the original image OG includes the base area CA and if the another area enclosed by the base area CA all around is a color unit area CA of lighter color than the base area CA, the control unit 10 performs a second process. The second process is specifically described below.

If the original image OG includes the base area CA and if the another area enclosed by the base area CA all around is a color unit area CA of lighter color than the base area CA, the control unit 10 performs a dividing process in which the base area CA is divided into a plurality of divided areas each of which is not annular. Then, the control unit 10 generates the masking sheet image data MD corresponding to a color of the base area CA for each of the plurality of divided areas. The control unit 10 allows the masking sheet image data MD of each of the plurality of divided areas to include the cutout guide image CG indicating that the corresponding divided area is the cutout area. In addition, the control unit 10 allows the masking sheet image data MD corresponding to a color of the color unit area CA enclosed by the base area CA all around (the area of lighter color than the base area CA) to include the cutout guide image CA indicating that the color unit area CA enclosed by the base area CA all around is the cutout area.

Here, the control unit 10 performs a process of dividing the base area CA into two areas as the dividing process. Then, the control unit 10 generates the cutout guide image CG corresponding to one divided area out of the two divided areas obtained by the dividing process (one divided area and the other divided area), which is an image indicating that one divided area to an area protruding into the other divided area by a predetermined amount is the cutout area.

Figure 8:
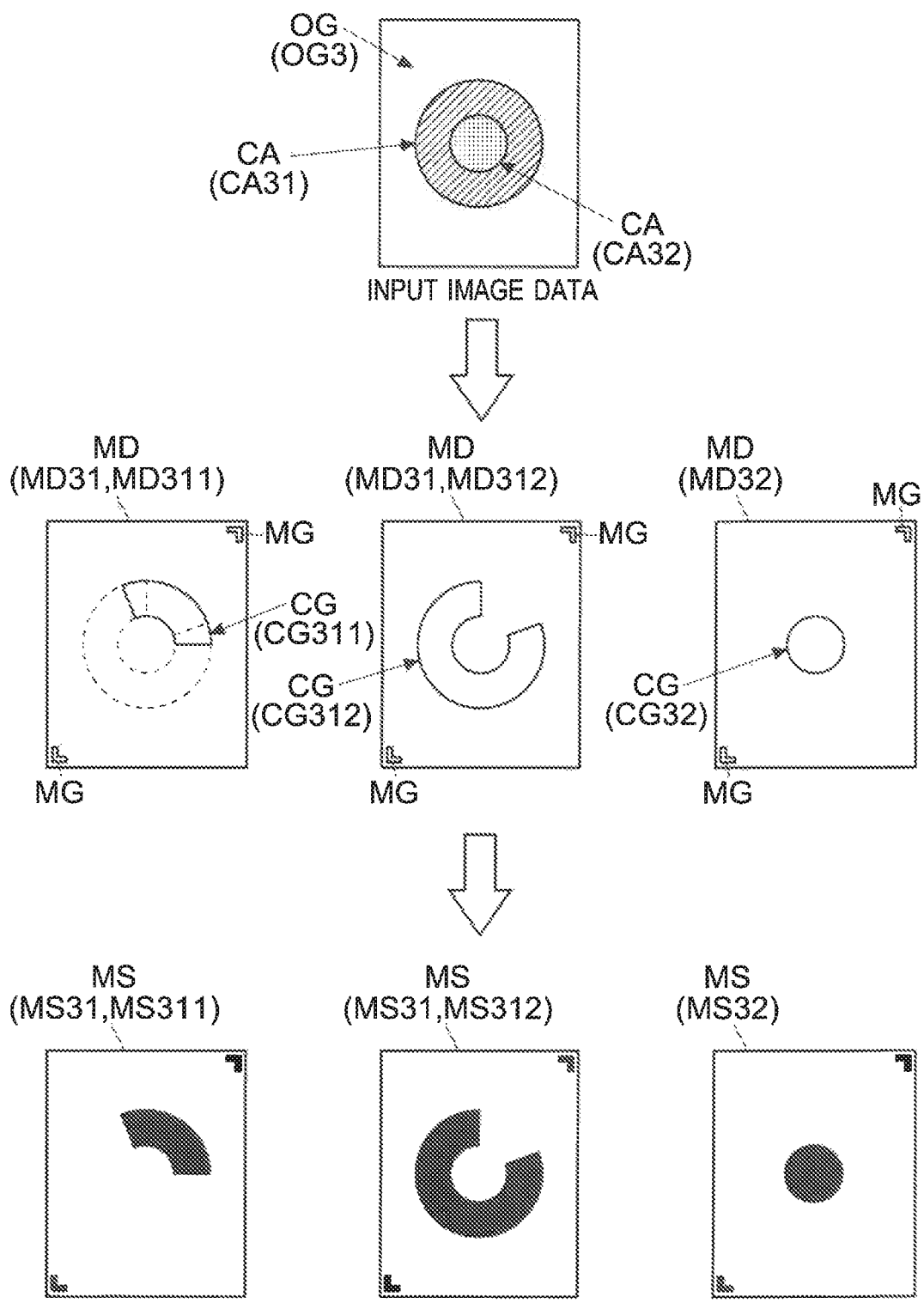
FIG. 8 is a diagram for explaining a second process performed by the control unit of the image forming apparatus according to one embodiment of the present disclosure.

For instance, it is supposed that an original image OG (OG3) includes a base area CA (CA31) as illustrated in the upper part of FIG. 8. In addition, it is supposed that the base area CA31 encloses another color unit area CA (CA32) all around. Furthermore, it is supposed that the color unit area CA32 (another area) is a color unit area of lighter color than the base area CA31.

In this case, as illustrated in the middle part in FIG. 8, two masking sheet image data MD (MD31) corresponding to a color of the base area CA31 are generated. In the following description, one masking sheet image data MD31 is denoted by MD311, and the other masking sheet image data MD31 is denoted by MD312.

Figure 9:
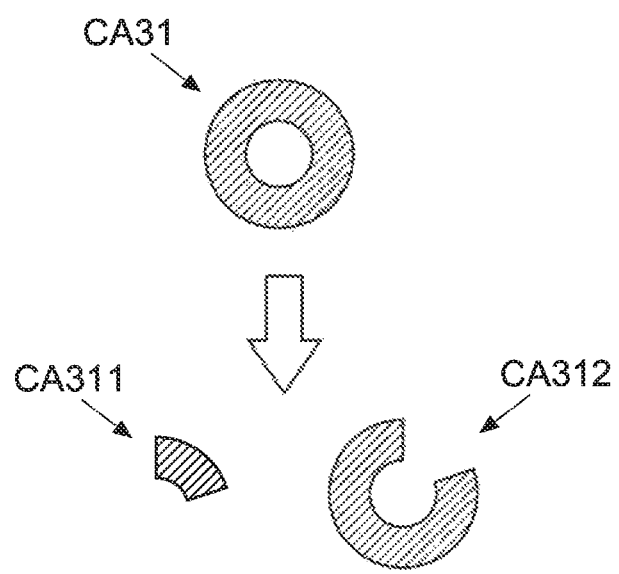
FIG. 9 is a diagram for explaining the second process (dividing process) performed by the control unit of the image forming apparatus according to one embodiment of the present disclosure.

The masking sheet image data MD311 includes a cutout guide image CG (CG311) indicating that one divided area obtained by dividing the base area CA31 into two areas is the cutout area. The masking sheet image data M0312 includes a cutout guide image CG (CG312) indicating that the other divided area obtained by dividing the base area CA31 into two areas is the cutout area. For instance, as illustrated in FIG. 9, the base area CA31 is divided into an area CA311 and an area CA312.

Further, as illustrated in the middle part in FIG. 8, the cutout guide image CG311 corresponding to one divided area protrudes into an area corresponding to the other divided area (shown by a broken line in the middle part in FIG. 8) by a predetermined amount. Note that each of the masking sheet image data MD311 and MD312 includes the mark images MG.

One masking sheet image data MD (MD32) corresponding to a color of the color unit area CA32 enclosed by the base area CA31 all around is generated. The masking sheet image data MD32 includes the cutout guide image CG (CG32) indicating that the color unit area CA32 is the cutout area. Note that the masking sheet image data MD32 includes the mark images MG.

After finishing the guide image print job based on the masking sheet image data MD illustrated in the middle part in FIG. 8, the cutting work is performed, and hence the masking sheets MS (MS31 and MS32) illustrated in the lower part of FIG. 8 are made. The masking sheets MS31 correspond to a color of the base area CA31. The masking sheet MS32 corresponds to a color of the color unit area CA32. Note that the masking sheets MS31 corresponding to a color of the base area CA31 include a masking sheet MS311 and a masking sheet MS312. The masking sheet MS311 is a sheet obtained by cutting the cutout area indicated by the cutout guide image CG311. The masking sheet MS312 is a sheet obtained by cutting the cutout area indicated by the cutout guide image CG312.

After making the masking sheet MS illustrated in the lower part of FIG. 8, the user first covers an object with the masking sheet MS311, and in this state, coloring material corresponding to the color of the base area CA31 (darker than that of the color unit area CA32) is applied to the object. Next, the user covers the object with the masking sheet MS312, and in this state, coloring material corresponding to the color of the base area CA31 is applied to the object. Note that it may be possible to perform drawing with the masking sheet MS311 after performing drawing with the masking sheet MS312.

After performing drawing with the masking sheets MS31, the user covers the object with the masking sheet MS32, and in this state, coloring material corresponding to the color of the color unit area CA32 is applied to the object. Note that it may be possible to perform drawing with the masking sheets M31 after performing drawing with the masking sheet MS32.

Here, as the method of drawing on the object the original image OG3 illustrated in the upper part of FIG. 8, there is a method of reapplying the coloring material corresponding to the color of the color unit area CA32 onto the coloring material corresponding to the color of the base area CA31. However, the color of the color unit area CA32 is lighter than that of the base area CA31, and hence by this method, the color of the base area CA31 may be seen through in the part corresponding to the color unit area CA32 (in the reapplied part).

In contrast, in the structure in which the second process is performed, the masking sheets MS31 (MS311 and MS312) and MS32 can be made. By using the masking sheets MS31 and MS32, reapplying is not required.

Further, by using the masking sheets MS311 and MS312, it is not necessary to separately prepare a masking sheet for masking the part corresponding to the color unit area CA32. In this way, drawing an image corresponding to the base area CA31 on the object can be efficiently performed, and hence convenience for the user is improved.

Further, the image drawn with the masking sheet MS311 and the image drawn with the masking sheet MS312 are partially overlapped, and hence occurrence of a gap between the two images can be prevented. In this way, appearance of the image drawn on the object can be enhanced.

(Third Process)

The control unit 10 determines whether or not the original image OG includes the base area CA (color unit area CA) that encloses another area all around. If the original image OG includes the base area CA, the control unit 10 determines whether or not the another area (the area enclosed by the base area CA all around) is a blank area BA (an area of the same color as the background color). If the original image OG includes the base area CA and if the another area enclosed by the base area CA all around is the blank area BA, the control unit 10 performs a third process. The third process is specifically described below.

If the original image OG includes the base area CA and if the another area enclosed by the base area CA all around is the blank area BA, the control unit 10 performs the dividing process in which the base area CA is divided into a plurality of divided areas each of which is not annular. Then, the control unit 10 generates the masking sheet image data MD corresponding to a color of the base area CA for each of the plurality of divided areas. The control unit 10 allows the masking sheet image data MD of each of the plurality of divided areas to include the cutout guide image CG indicating that the corresponding divided area is the cutout area.

Here, the control unit 10 performs a process of dividing the base area CA into two areas as the dividing process. Then, the control unit 10 generates the cutout guide image CG corresponding to one divided area out of the two divided areas obtained by the dividing process (one divided area and the other divided area), which is an image indicating that one divided area to an area protruding into the other divided area by a predetermined amount is the cutout area.

Figure 10:
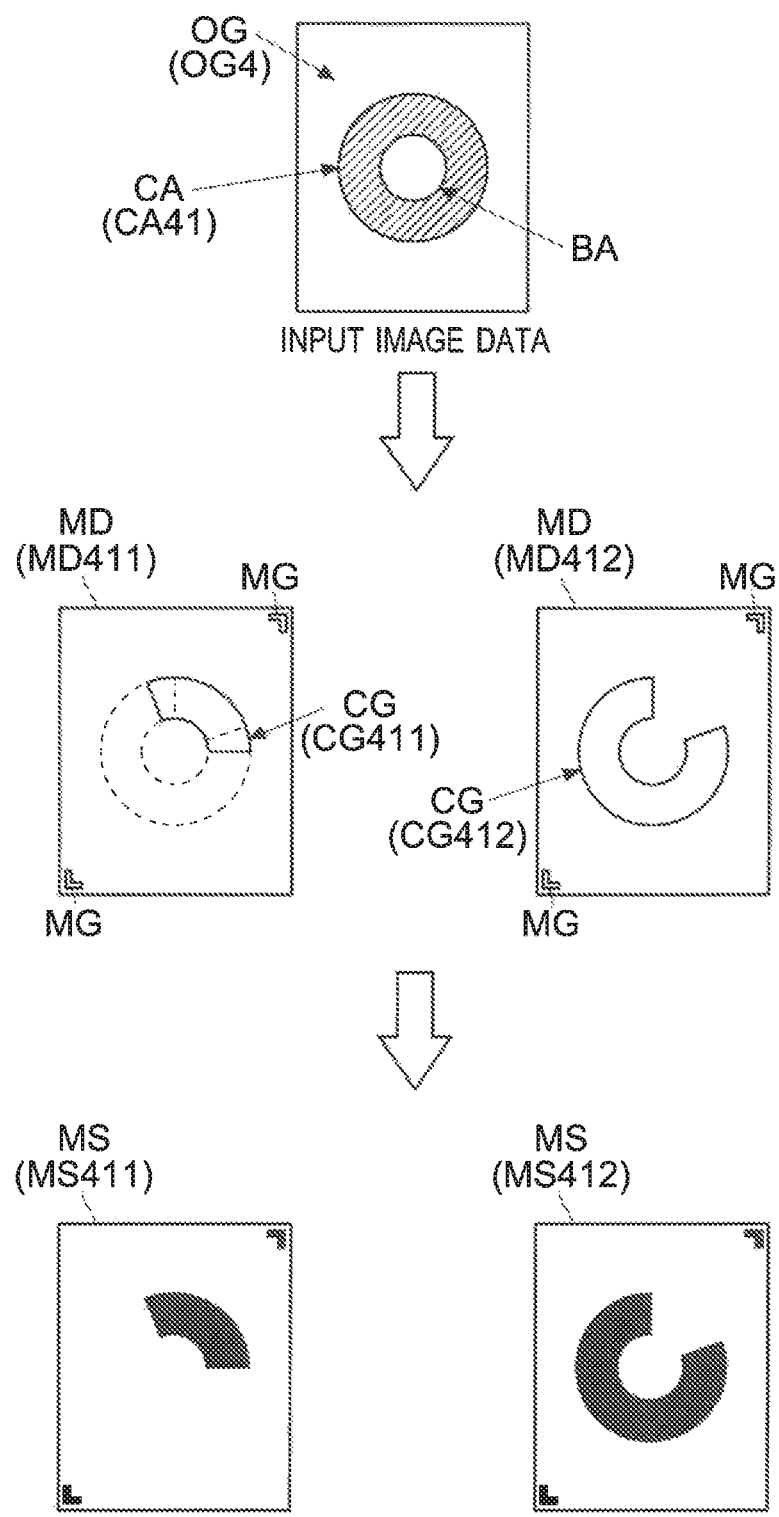
FIG. 10 is a diagram for explaining a third process performed by the control unit of the image forming apparatus according to one embodiment of the present disclosure.

For instance, it is supposed that an original image OG (OG4) includes a base area CA (CA41) as illustrated in the upper part of FIG. 10. In addition, it is supposed that the base area CA41 encloses the blank area BA all around.

In this case, as illustrated in the middle part of FIG. 10, two masking sheet image data MD corresponding to a color of the base area CA41 are generated. In the following description, one masking sheet image data MD is denoted by MD411, and the other masking sheet image data MD is denoted by MD412.

The masking sheet image data MD411 includes the cutout guide image CG (CG41 indicating that one divided area obtained by dividing the base area CA41 into two areas is the cutout area. The masking sheet image data MD412 includes the cutout guide image CG (CG412) indicating that the other divided area obtained by dividing the base area CA41 into two areas is the cutout area.

Further, the cutout guide image CG411 corresponding to one divided area protrudes into an area corresponding to the other divided area (shown by a broken line in the middle part of FIG. 10) by a predetermined amount. Note that each of the masking sheet image data MD411 and MD412 includes the mark images MG.

After finishing the guide image print job based on the masking sheet image data MD illustrated in the middle part in FIG. 10, the cutting work is performed, and hence the masking sheets MS (MS411 and MS412) illustrated in the lower part of FIG. 10 are made. The masking sheets MS411 and MS412 correspond to a color of the base area CA41. The masking sheet MS411 is a sheet obtained by cutting the cutout area indicated by the cutout guide image CG411. The masking sheet MS412 is a sheet obtained by cutting the cutout area indicated by the cutout guide image CG412.

After making the masking sheet MS illustrated in the lower part of FIG. 10, the user first covers an object with the masking sheet MS411, and in this state, coloring material corresponding to the color of the base area CA41 is applied to the object. Next, the user covers the object with the masking sheet MS412, and in this state, coloring material corresponding to the color of the base area CA41 is applied to the object. Note that it may be possible to perform drawing with the masking sheet MS411 after performing drawing with the masking sheet MS412.

In the structure in which the third process is performed, the masking sheets MS411 and MS412 can be made. By using the masking sheets MS411 and MS412, without separately preparing a masking sheet for masking the part corresponding to the blank area BA, the image corresponding to the base area CA41 (the image with blank inside) can be drawn on the object, and hence convenience for the user is improved.

Further, the image drawn with the masking sheet MS411 and the image drawn with the masking sheet MS412 are partially overlapped, and hence occurrence of a gap between the two images can be prevented. In this way, appearance of the image corresponding to the base area CA41 can be enhanced.

(Fourth Process)

The control unit 10 determines whether or not the original image OG includes the base area CA (color unit area CA) that encloses another area all around. If the original image OG includes the base area CA, the control unit 10 determines whether or not there are a plurality of other areas enclosed by the base area CA all around. If the original image OG includes the base area CA and if there are a plurality of other areas enclosed by the base area CA all around, the control unit 10 performs a fourth process. The fourth process is specifically described below.

Figure 11:
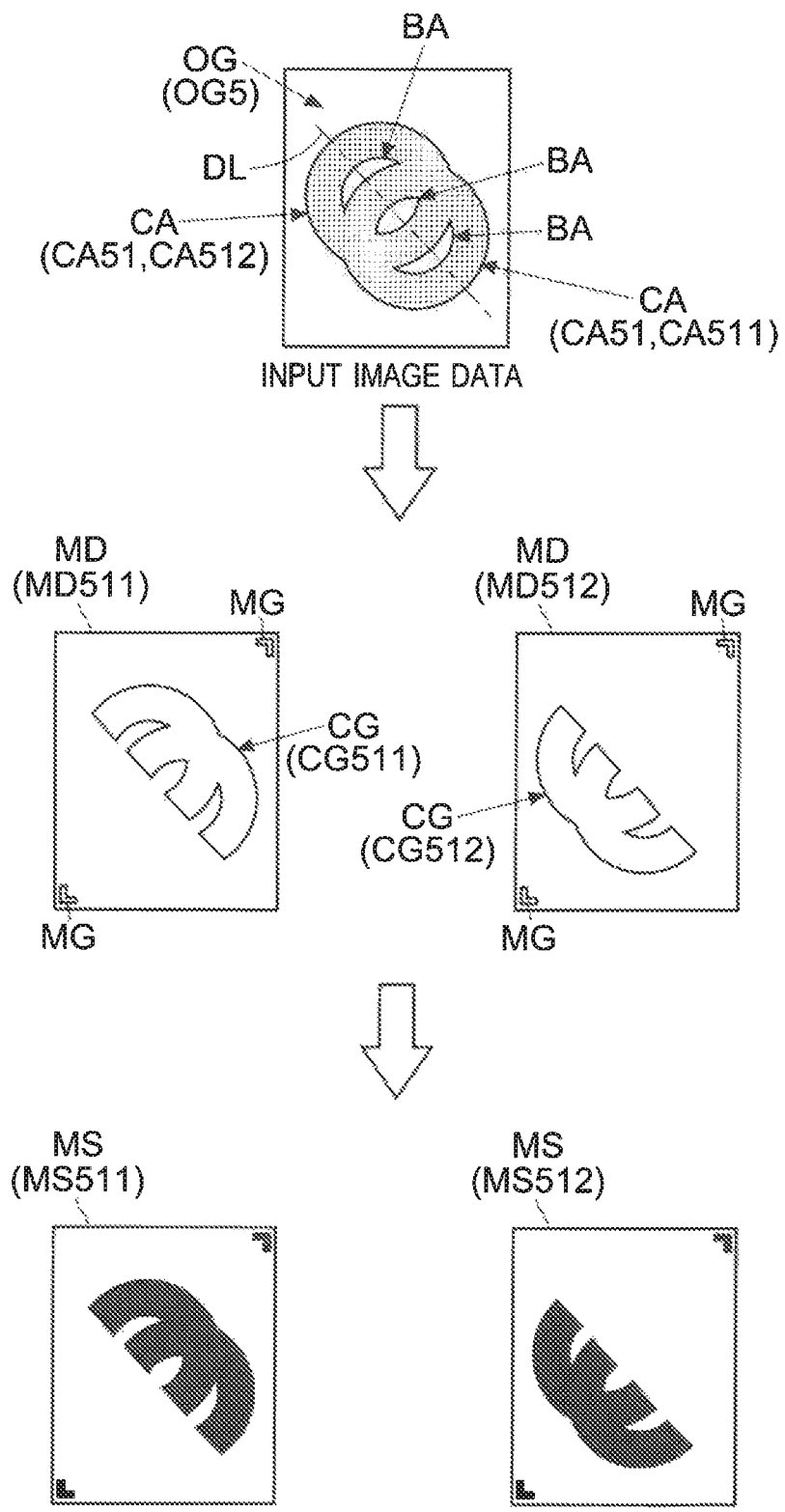
FIG. 11 is a diagram for explaining a fourth process performed by the control unit of the image forming apparatus according to one embodiment of the present disclosure.

If the original image OG includes the base area CA and if there are a plurality of other areas enclosed by the base area CA all around, the control unit 10 sets a line that crosses all the plurality of other areas (e.g. a line that crosses center coordinates of each of the plurality of other areas), as a dividing line DL (see the upper part of FIG. 11). Then, the control unit 10 divides the base area CA along the dividing line DL. If there is one dividing line DL, the base area CA is divided into two divided areas. Note that the dividing line DL that crosses one other area is not necessarily the same as the dividing line DL that crosses different other area. In other words, the base area CA may be divided into three or more areas.

Further, the control unit 10 generates the masking sheet image data MD corresponding to a color of the base area CA for each of the two divided areas. The control unit 10 allows the masking sheet image data MD of each of the two divided areas to include the cutout guide image CG indicating that the corresponding divided area is the cutout area. Here, the control unit 10 generates the cutout guide image CG corresponding to one divided area, which is an image indicating that one divided area to an area protruding into the other divided area by a predetermined amount is the cutout area.

Further, if the other area enclosed by the base area CA all around is the color unit area CA, the control unit 10 generates the masking sheet image data MD corresponding to a color of the color unit area CA enclosed by the base area CA all around. The masking sheet image data MD includes the cutout guide image CG indicating that the color unit area CA enclosed by the base area CA all around is the cutout area. If the other area enclosed by the base area CA all around is a blank area BA, the masking sheet image data MD corresponding to the other area enclosed by the base area CA all around is not generated.

For instance, it is supposed that the original image OG (OG5) includes the base area CA (CA51) as illustrated in the upper part of FIG. 11. In addition, it is supposed that the base area CA51 encloses each of a plurality of blank areas BA all around.

In this case, one line crossing all the plurality of blank areas BA is set as the dividing line DL. Then, the base area CA51 is divided along the dividing line DL. In the upper part of FIG. 11, the dividing line DL is shown by a dashed dotted line.

When the base area CA51 is divided along the dividing line DL, two masking sheet image data MD corresponding to a color of the base area CA51 are generated as illustrated in the middle part of FIG. 11. In the following description, one of the masking sheet image data MD is denoted by MD511, and the other masking sheet image data MD is denoted by MD512.

The masking sheet image data MD511 includes the cutout guide image CG (CG511) indicating that one divided area obtained by dividing the base area CA51 into two areas is the cutout area. The masking sheet image data MD512 includes the cutout guide image CG (CG512) indicating that the other divided area obtained by dividing the base area CA51 into two areas is the cutout area. Note that each of the masking sheet image data D511 and D512 includes the mark images MG.

After finishing the guide image print job based on the masking sheet image data MD illustrated in the middle part of FIG. 11, the cutting work is performed, and hence the masking sheets MS (MS511 and MS512) illustrated in the Mower part of FIG. 11 are made. The masking sheets MS511 and MS512 correspond to a color of the base area CA51. The masking sheet MS511 is a sheet obtained by cutting the cutout area indicated by the cutout guide image CG511. The masking sheet MS512 is a sheet obtained by cutting the cutout area indicated by the cutout guide image CG512.

After making the masking sheet MS illustrated in the lower part of FIG. 11, the user first covers an object with the masking sheet MS511, and in this state, coloring material corresponding to the color of the base area CA51 is applied to the object. Next, the user covers the object with the masking sheet MS512, and in this state, coloring material corresponding to the color of the base area CA51 is applied to the object. Note that it may be possible to perform drawing with the masking sheet MS511 after performing drawing with the masking sheet MS512.

In the structure in which the fourth process is performed, the masking sheets MS511 and MS512 can be made. By using the masking sheets MS511 and MS512, without separately preparing a masking sheet for masking the parts corresponding to the plurality of other areas enclosed by the base area CA all around, the image corresponding to the base area CA51 can be drawn on the object, and hence convenience for the user is improved.

(Fifth Process)

The control unit 10 determines whether or not the original image OG includes two color unit areas CA that contact each other. If the original image OG includes two color unit areas CA that contact each other, the control unit 10 performs a fifth process. The fifth process is specifically described below.

If the original image OG includes two color unit areas CA that contact each other, the control unit 10 sets one of the two color unit areas CA as a first color unit area CA and sets the other as a second color unit area CA. Then, the control unit 10 allows the masking sheet image data MD corresponding to a color of the first color unit area CA to include the cutout guide image CG indicating that the first color unit area CA to an area protruding into the second color unit area CA by a predetermined amount is the cutout area. In addition, the control unit 10 allows the masking sheet image data MD corresponding to a color of the second color unit area CA to include the cutout guide image CG indicating that the second color unit area CA is the cutout area.

Here, the control unit 10 recognizes the color unit area CA of lighter color out of the two color unit areas CA that contact each other, and sets the recognized color unit area CA as the first color unit area CA. Note that it may be possible to receive user's selection, which one of the two color unit areas CA that contact each other should be set as the first color unit area CA.

Figure 12:
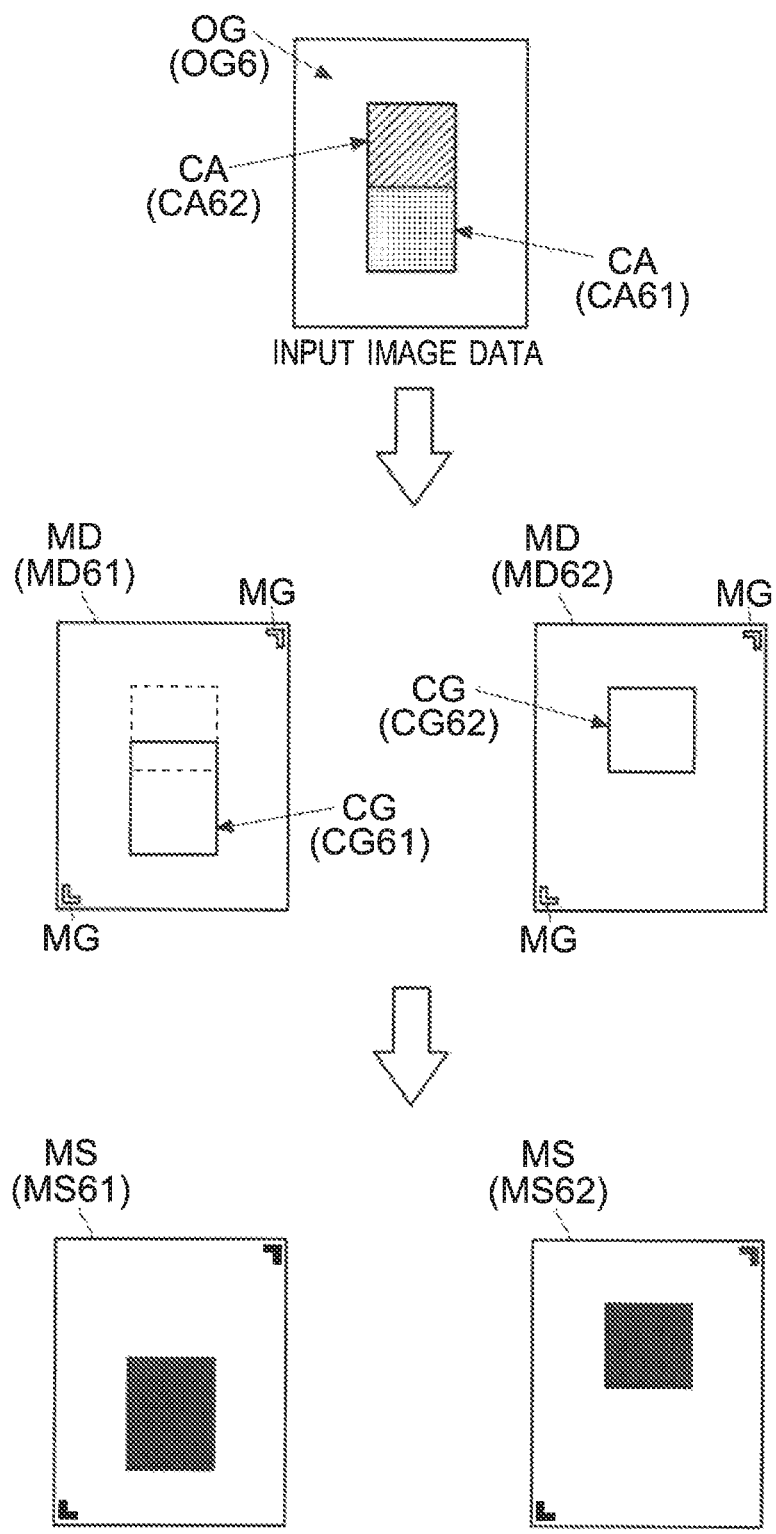
FIG. 12 is a diagram for explaining a fifth process performed by the control unit of the image forming apparatus according to one embodiment of the present disclosure.

For instance, it is supposed that the original image OG (OG6) includes the color unit areas CA (CA61 and CA62) as illustrated in the upper part of FIG. 12. In addition, it is supposed that the color unit areas CA61 and CA62 contact each other, and that a color of the color unit area CA61 is lighter than a color of the color unit area CA62. In other words, the color unit area CA61 is the first color unit area, and the color unit area CA62 is the second color unit area.

In this case, as illustrated in the middle part of FIG. 12, the masking sheet image data MD (MD61) corresponding to a color of the color unit area CA61 is generated. In addition, the masking sheet image data MD (MD62) corresponding to a color of the color unit area CA62 is generated.

The masking sheet image data MD61 includes a cutout guide image CG (CG61) indicating that the color unit area CA61 to an area protruding into the color unit area CA62 (illustrated by a broken line in the middle part of FIG. 12) by a predetermined amount is the cutout area. The masking sheet image data MD62 includes a cutout guide image CG (CG62) indicating that the color unit area CA62 is the cutout area. Note that each of the masking sheet image data MD61 and MD62 includes the mark images MG.

After finishing the guide image print job based on the masking sheet image data MD illustrated in the middle part of FIG. 12, the cutting work is performed, and hence the masking sheets MS (MS61 and MS62) illustrated in the lower part of FIG. 12 are made. The masking sheet MS61 corresponds to a color of the color unit area CA61. The masking sheet MS62 corresponds to a color of the color unit area CA62.

After making the masking sheet MS illustrated in the lower part of FIG. 12, the user first covers an object with the masking sheet MS61, and in this state, coloring material corresponding to the color of the color unit area CA61 (lighter than that of the color unit area CA62) is applied to the object. Next, the user covers the object with the masking sheet MS62, and in this state, coloring material corresponding to the color of the color unit area CA62 is applied to the object.

In the structure in which the fifth process is performed, the masking sheets MS61 and MS62 can be easily made. By using the masking sheets MS61 and MS62, the image drawn with the masking sheet MS61 and the image drawn with the masking sheet MS62 are partially overlapped, and hence occurrence of a gap between the two images can be prevented. In this way, appearance of the image drawn on the object can be enhanced.

Further, the color used for drawing with the masking sheet MS61 (the color of the coloring material applied first onto the object) is lighter than that used for drawing with the masking sheet MS62, and hence, even if the image drawn with the masking sheet MS61 and the image drawn with the masking sheet MS62 are partially overlapped, the color of the coloring material applied first can be prevented from being seen through.

<Reduction of Masking Sheets>

For instance, when the image data including the original image OG3 as illustrated in the upper part of FIG. 8 is input to the image forming apparatus 100, a second process is performed. Therefore, the number of the masking sheets MS is three (see the lower part of FIG. 8).

If it is allowed to use the masking sheet MS in which the entire area inside the contour line of the base area CA31 is opened, the number of the masking sheets MS can be reduced to two. One of the two masking sheet MS is the masking sheet MS in which the entire area inside the contour line of the base area CA31 is opened (referred to as the first masking sheet MS), and the other is the masking sheet MS in which the color unit area CA32 is opened (referred to as the second masking sheet MS).

When performing drawing using the first and second masking sheets MS, an object is first covered with the first masking sheet MS, and in this state, coloring material corresponding to the color of the base area CA31 is applied to the object. After that, the object is covered with the second masking sheet MS, and in this state, coloring material corresponding to the color of the color unit area CA32 is applied to the object. In other words, in the part corresponding to the color unit area CA32, coloring material corresponding to the color of the color unit area CA32 is reapplied onto the coloring material corresponding to the color of the base area CA31. Therefore, there is high probability that color tone of the image drawn on the object is different from that of the original image.

Therefore, if precise reproduction of the color tone is desired, it is preferred to use three masking sheets MS (see the lower part of FIG. 8). However, some users may want to reduce the number of the masking sheets MS even if the color tone is sacrificed.

Therefore, the control unit 10 determines whether or not the original image OG includes the base area CA (color unit area CA) that encloses another area all around. If the original image OG includes the base area CA, the control unit 10 determines whether or not the another area (the area enclosed by the base area CA all around) is the color unit area CA of lighter color than the base area CA.

If the original image OG includes the base area CA and if the another area enclosed by the base area CA all around is the color unit area CA of lighter color than the base area CA, the control unit 10 allows the operation panel 15 to receive a selection operation for selecting whether or not to allow use of the masking sheet MS in which the entire area inside the contour line of the base area CA is opened. For instance, the operation panel 15 notifies that there is a method of reducing the number of the masking sheets MS, and receives the selection operation by the user.

When the selection operation indicating allowance is received, the control unit 10 performs the first process instead of the second process. In other words, the control unit 10 allows the masking sheet image data MD corresponding to a color of the base area CA to include the cutout guide image CG indicating that the entire area inside the contour line of the base area CA is the cutout area. In addition, control unit 10 allows the masking sheet image data MD corresponding to a color of the color unit area CA enclosed by the base area CA all around to include the cutout guide image CG indicating that the color unit area CA enclosed by the base area CA all around is the cutout area.

With the structure receiving the selection operation for selecting whether or not to allow use of the masking sheet MS in which the entire area inside the contour line of the base area CA is opened, the number of the masking sheets MS can be reduced.

The embodiment disclosed in this specification is merely an example in every aspect and should not be interpreted as limitations. The scope of the present disclosure is defined not by the above description of the embodiment but by the claims, and should be understood to include all modifications within the meaning and the scope equivalent to the claims.

What is claimed is:

1. An image forming apparatus for printing a cutout guide image indicating a cutout area as an area to be cut out on a material sheet to be used as a masking sheet, the apparatus comprising:
    a control unit configured to perform area division by color of an original image included in input image data input to the image forming apparatus, and to generate masking sheet image data of each color including the cutout guide image corresponding to a color unit area obtained by the area division by color of the original image, on the basis of color density and a shape of the color unit area; and
    a printing unit configured to execute a print job based on the masking sheet image data so as to print the cutout guide image on the material sheet.

2. The image forming apparatus according to claim 1, wherein if the original image includes a base area as the color unit area enclosing another area all around, and if the another area is the color unit area of darker color than the base area, the control unit allows the masking sheet image data corresponding to a color of the base area to include the cutout guide image indicating that the entire area inside a contour line of the base area is the cutout area, and allows the masking sheet image data corresponding to a color of the another area to include the cutout guide image indicating that the another area is the cutout area.

3. The image forming apparatus according to claim 1, wherein if the original image includes a base area as the color unit area enclosing another area all around, and if the another area is the color unit area of lighter color than the base area, the control unit divides the base area into a plurality of divided areas each of which is not annular, generates the masking sheet image data corresponding to a color of the base area for each of the plurality of divided areas, allows the masking sheet image data of each of the plurality of divided areas to include the cutout guide image indicating that the corresponding divided area is the cutout area, and allows the masking sheet image data corresponding to a color of the another area to include the cutout guide image indicating that the another area is the cutout area.

4. The image forming apparatus according to claim 3, further comprising an operation panel for receiving an operation by a user, wherein
    if the another area enclosed by the base area all around is the color unit area of lighter color than the base area, the control unit allows the operation panel to receive selection operation for selecting whether or not to allow use of the masking sheet in which the entire area inside a contour line of the base area is opened, and
    when the selection operation indicating allowance is received, the control unit does not divide the base area, and allows the masking sheet image data corresponding to a color of the base area to include the cutout guide image indicating that the entire area inside the contour line of the base area is the cutout area.

5. The image forming apparatus according to claim 3, wherein when dividing the base area enclosing a plurality of other areas all around, the control unit divides the base area along a line crossing the plurality of other areas.

6. The image forming apparatus according to claim 1, wherein if the original image includes a base area as the color unit area enclosing another area all around, and if the another area is a blank area, the control unit divides the base area into a plurality of divided areas each of which is not annular, generates the masking sheet image data corresponding to a color of the base area for each of the plurality of divided areas, and allows the masking sheet image data of each of the plurality of divided areas to include the cutout guide image indicating that the corresponding divided area is the cutout area.

7. The image forming apparatus according to claim 1, wherein if the original image includes first and second color unit areas contacting each other, the control unit allows the masking sheet image data corresponding to a color of the first color unit area to include the cutout guide image indicating that the first color unit area to an area protruding into the second color unit area by a predetermined amount is the cutout area, and allows the masking sheet image data corresponding to a color of the second color unit area to include the cutout guide image indicating that the second color unit area is the cutout area.

8. The image forming apparatus according to claim 1, wherein the control unit attaches a predetermined mark image to a plurality of the masking sheet image data at the same position.

* * * * *